(12) United States Patent
Segura Martinez De Ilarduya et al.

(10) Patent No.: US 10,975,769 B2
(45) Date of Patent: Apr. 13, 2021

(54) OIL HEATING SYSTEM ADAPTED FOR TURBINE ENGINE TO REDUCE STARTING TORQUE

(71) Applicant: Airbus Operations, S.L., Madrid (ES)

(72) Inventors: Leire Segura Martinez De Ilarduya, Getafe (ES); Alberto Juarez Becerril, Getafe (ES); Salvatore Demelas, Getafe (ES)

(73) Assignee: Airbus Operations, S.L., Getafe (ES)

( * ) Notice: Subject to any disclaimer, the term of this patent is extended or adjusted under 35 U.S.C. 154(b) by 286 days.

(21) Appl. No.: 15/842,352

(22) Filed: Dec. 14, 2017

(65) Prior Publication Data
US 2018/0187601 A1    Jul. 5, 2018

(30) Foreign Application Priority Data

Dec. 14, 2016  (EP) .................... 16382600

(51) Int. Cl.
*F02C 7/268* (2006.01)
*F02C 7/06* (2006.01)
(Continued)

(52) U.S. Cl.
CPC ............. *F02C 7/06* (2013.01); *F01D 25/10* (2013.01); *F01D 25/20* (2013.01); *F02C 7/14* (2013.01); *F02C 7/268* (2013.01); *F28D 7/0008* (2013.01); *B64D 41/00* (2013.01); *F02C 7/22* (2013.01); *F05D 2220/323* (2013.01);
(Continued)

(58) Field of Classification Search
CPC ........... F05D 2260/85; F05D 2260/213; F01D 25/10; F02C 7/268
See application file for complete search history.

(56) References Cited

U.S. PATENT DOCUMENTS 5,615,547 A    4/1997 Beutin et al.
8,261,527 B1   9/2012 Stearns et al.
(Continued)

FOREIGN PATENT DOCUMENTS

EP        1923542 A2     5/2008
WO   WO 2007/128098 A1  11/2007

OTHER PUBLICATIONS

Extended European Search Report for Application No. 16382600 dated Jun. 16, 2017.

*Primary Examiner* — Gerald L Sung
*Assistant Examiner* — Rene D Ford
(74) *Attorney, Agent, or Firm* — Jenkins, Wilson, Taylor & Hunt, P.A.

(57) ABSTRACT

An oil heating system in a turbine engine such as an aircraft turbojet or turboprop main engines, or in an aircraft auxiliary power unit (APU). The turbine oil heating system includes a turbine engine oil circuit for conducting lubricating oil to the turbine engine, an electric starter generator oil circuit for conducting cooling oil from the electric starter generator, and an oil-to-oil heat exchanger connected with the engine oil circuit and connectable with the electric starter generator oil circuit, for transferring heat from the starter generator oil to the engine oil as to warm-up the engine oil during turbine engine motoring prior to actual starting sequence. A low cost and highly integrated system is therefore provided for reducing drag torque of a turbine engine prior to the starting phase.

15 Claims, 6 Drawing Sheets

(51) Int. Cl.
  *F01D 25/20* (2006.01)
  *F01D 25/10* (2006.01)
  *F02C 7/14* (2006.01)
  *F28D 7/00* (2006.01)
  *B64D 41/00* (2006.01)
  *F02C 7/22* (2006.01)

(52) U.S. Cl.
  CPC .... *F05D 2220/76* (2013.01); *F05D 2260/213* (2013.01); *F05D 2260/85* (2013.01); *F05D 2260/98* (2013.01); *F05D 2270/303* (2013.01); *Y02T 50/60* (2013.01)

(56) References Cited

U.S. PATENT DOCUMENTS

| | | | |
|---|---|---|---|
| 8,381,509 B2 * | 2/2013 | Bulin | F01D 19/00 60/204 |
| 8,443,582 B1 | 5/2013 | Phillips et al. | |
| 2006/0260323 A1 * | 11/2006 | Moulebhar | F01D 21/003 60/793 |
| 2007/0084214 A1 * | 4/2007 | Schmidt | F01D 25/18 60/778 |
| 2007/0234739 A1 * | 10/2007 | Delaloye | F01D 19/00 60/786 |
| 2009/0159246 A1 * | 6/2009 | Cornet | F01D 25/08 165/138 |

* cited by examiner

OIL HEATING SYSTEM ADAPTED FOR TURBINE ENGINE TO REDUCE STARTING TORQUE

CROSS-REFERENCE TO RELATED APPLICATION

This application claims the benefit of and priority to European patent application No. 16382600.1, filed on Dec. 14, 2016, the entire disclosure of which is incorporated by reference herein.

TECHNICAL FIELD

The present disclosure relates generally to an oil heating system in a turbine engine such as an aircraft turbojet or turboprop main engines, or in an aircraft Auxiliary Power Unit (APU). More particularly, the disclosure herein relates to a low cost and highly integrated system for reducing drag torque of a turbine engine prior to the starting phase.

BACKGROUND

Turbine engine starting systems are currently designed for worst scenario, that is, extreme cold conditions down to −40° C., when the effects of the oil viscosity and aerodynamics are very significant. During such cold weather conditions, the total engine starting drag torque is enlarged due to the following phenomena:
- Oil viscosity: low ambient temperature significantly increases oil viscosity from engine turbomachinery and accessories within the gearbox and the bearings.
- Aerodynamic drags: high ambient air densities tend to increase aerodynamic drags through the turbomachinery.

In order to overcome the effects of low temperature and minimize the additional drag caused by higher oil viscosity, turbomachines starting systems could eventually incorporate an oil heater, usually a thermostatically controlled electric resistor inserted at the gearbox oil reservoir and powered by the aircraft electrical system. The oil heater is used to increase oil temperature during cold conditions, and therefore to reduce oil viscosity and to reduce total engine starting drag torque.

Typically, the power range of an APU oil heater for a commercial aircraft may vary between 500 W and 1 kW so that, one of the drawback of oil heaters, is that they increase the weight and complexity of the engines while they are not used during the majority of the aircraft operating conditions.

Most of aircraft main engines rely on turbine starters to initiate engine rotation. More recently, electrical starting technologies have been introduced; like Starter Generator Systems. A Starter Generator System typically includes a synchronous electrical machine used as a motor to provide mechanical power (torque) for starting the turbine engine, and as a generator to generate electric power for supplying the aircraft electrical systems, once the turbine engine has been started. The engine starting drag torque becomes a critical issue in order not to oversize the electrical machine due to starting requirements, Most of the duty cycle of the Starter Generator corresponds to the generation mode, whereas extremely low part of the duty cycle corresponds to the starting mode. Ideally, the electrical engine should be sized to its nominal operating point and not for one particular point. If the power level requirements for the starting mode are higher than the power requirements for generation, the Starter Generator Systems would end up being oversized for most of its duty cycle. This situation is not desirable, because Starter Generator oversize leads to a weight and volume increase of the electric machine and power converters.

On one hand, it is a known practice to connect oil and fuel circuits via heat exchangers to cool down oil used in turbine engines for lubricating components like rolling bearings, during the normal use of the turbine engine. The oil is cooled down by exchanging heat with the fuel flow (cooler than the oil) that is later on fed to injectors of the combustion chamber of a turbine engine.

For that purpose, a main oil-to-fuel heat exchanger is traditionally connected with the oil and fuel circuits downstream or upstream relative to an oil-to-air heat exchanger, mounted at the oil circuit for cooling the oil output from the turbine engine.

On the other hand, it has been detected the need in this technical field to optimize the sizing of the Starter Generator System (SGS), in order to reduce its weight and volume. Therefore, an oil heating system is proposed to reduce turbomachinery drag torque prior to the actual starting sequence, and consequently to reduce the electrical power required by the Starter Generator. The starting power requirements are then minimized, which will lead to a further optimization of both the electrical machine and power converters sizing.

For this other purpose, a heat transfer method is disclosed herein to transfer the rejected heat from the Starter Generator oil circuit to the turbomachinery oil circuit.

SUMMARY

The disclosure herein is based on a technique or method for heating the lubricating oil of a turbine engine prior to the starting sequence, but instead of relying on resistive elements (heaters) installed at the oil reservoir, using the electric Starter Generator capability to generate/reject heat to increase the temperature of the turbine engine oil prior to engine starting.

Therefore, one aspect of the disclosure herein refers to a turbine engine comprising a turbine engine oil circuit for conducting lubricating oil to the turbine engine, and a Starter Generator oil circuit for conducting cooling oil from the Starter Generator. The system further comprises an oil-to-oil heat exchanger connected with the engine oil circuit and connectable with the Starter Generator oil circuit. Here, the meaning of "heat exchanger" must be understood as to encompass any device capable of transferring heat between two fluids, independently of the technology.

Another object of the disclosure herein is to downsize the Starter Generator System (SGS) associated to a turbine engine, to the maximum power required during the generation phase.

By adding a secondary oil-to-oil heat exchanger in series with the main oil-to-fuel heat exchanger, the heat produced by Starter Generator can be transferred to the main engine oil during a motoring operation in order to warm up the engine oil prior to the actual starting sequence. Once the target temperature is reached during the engine motoring through the heat transfer from the starter generator oil to the main engine oil, the starting sequence can be commanded.

Warming the oil up prior to the engine starting sequence reduces the turbine engine oil viscosity prior to the starting phase according to the disclosure herein, which in turn implies that the power demand of the Starter Generator is also reduced. In this way, an optimized Starter Generator in terms of weight and volume can be used, and the electrical starting system can be downsized to the minimum power levels required during generation phase.

The disclosure herein can be implemented in aircraft main engines, and/or in an aircraft APU.

An additional advantage of the disclosure herein, is that no specific maintenance procedure and external equipment would be required for starting aircraft turbine engines when ambient temperature is below −40° C.

If an aircraft stays under extreme cold conditions and the engine oil temperature drops below −40° C., specific procedures using equipment are nowadays applied. However, with the system of the disclosure herein, the engine oil temperature can be easily increased to the minimum required starting temperature.

BRIEF DESCRIPTION OF THE DRAWINGS

Preferred embodiments of the disclosure herein are henceforth described with reference to the accompanying, example drawings, wherein.

DETAILED DESCRIPTION

Figure 1:
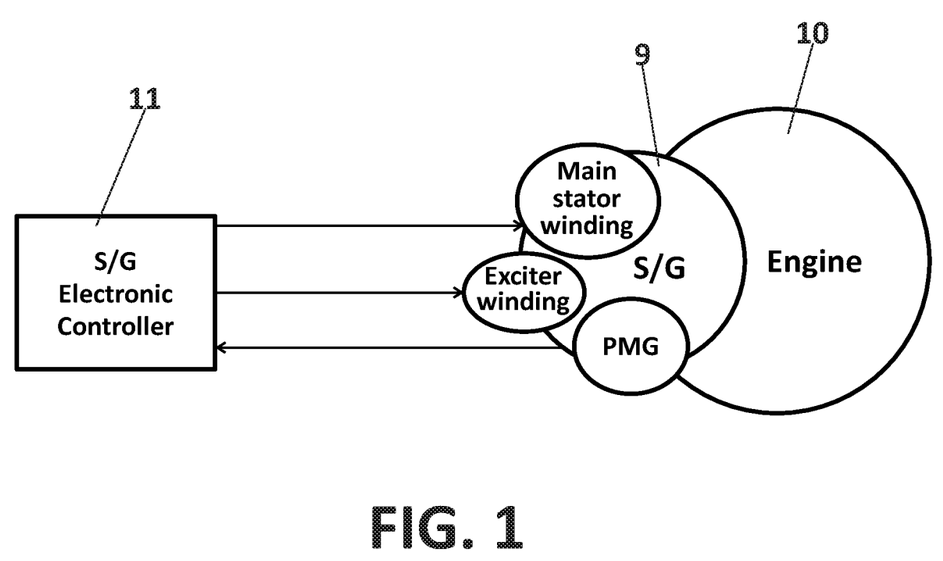
FIG. 1 shows a schematic diagram of a Starter Generator System for a turbine engine.

FIG. 1 shows a general diagram of a Starter Generator System formed by a Starter/Generator (9) usually a synchronous electric machine, mechanically coupled with a turbine engine (10) for example a turbofan or turboprop engine. The Starter/Generator (9) is used as a motor for starting the turbine engine (10), and once this has been started, during the normal operation of the turbine engine (10), the Starter/Generator (9) is used as a generator of electric power. An electronic controller (11) is in charge of controlling the operation of the Starter/Generator (9) stator and exciter windings.

Figure 2:
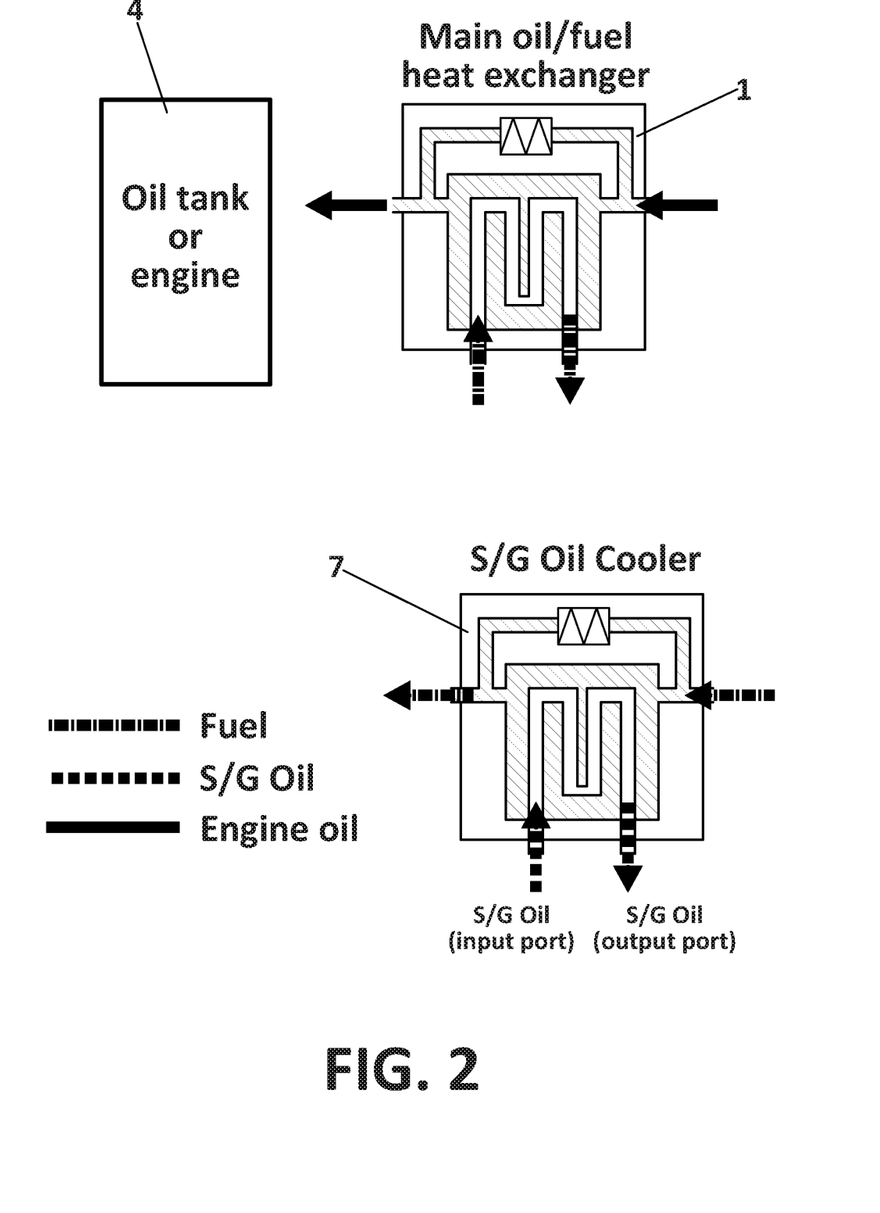
FIG. 2 shows a schematic diagram of a classical architecture of both turbine engine and Starter Generator cooling circuits.

The classical architecture of a turbine engine cooling circuit, is represented in FIG. 2, wherein it can be observed that the Starter/Generator (9) is provided with its own cooling oil circuit including a oil-to-fuel heat exchanger (7), which is completely segregated from the turbine engine oil cooling circuit to avoid any potential engine oil contamination in case of generator failure. In current implementations, both, the engine and the Starter/Generator (9) cooling systems are typically implemented by oil-to-fuel heat exchangers, eventually aided by additional oil-to-air heat exchangers that use external air to cool down the oil.

Figure 4:
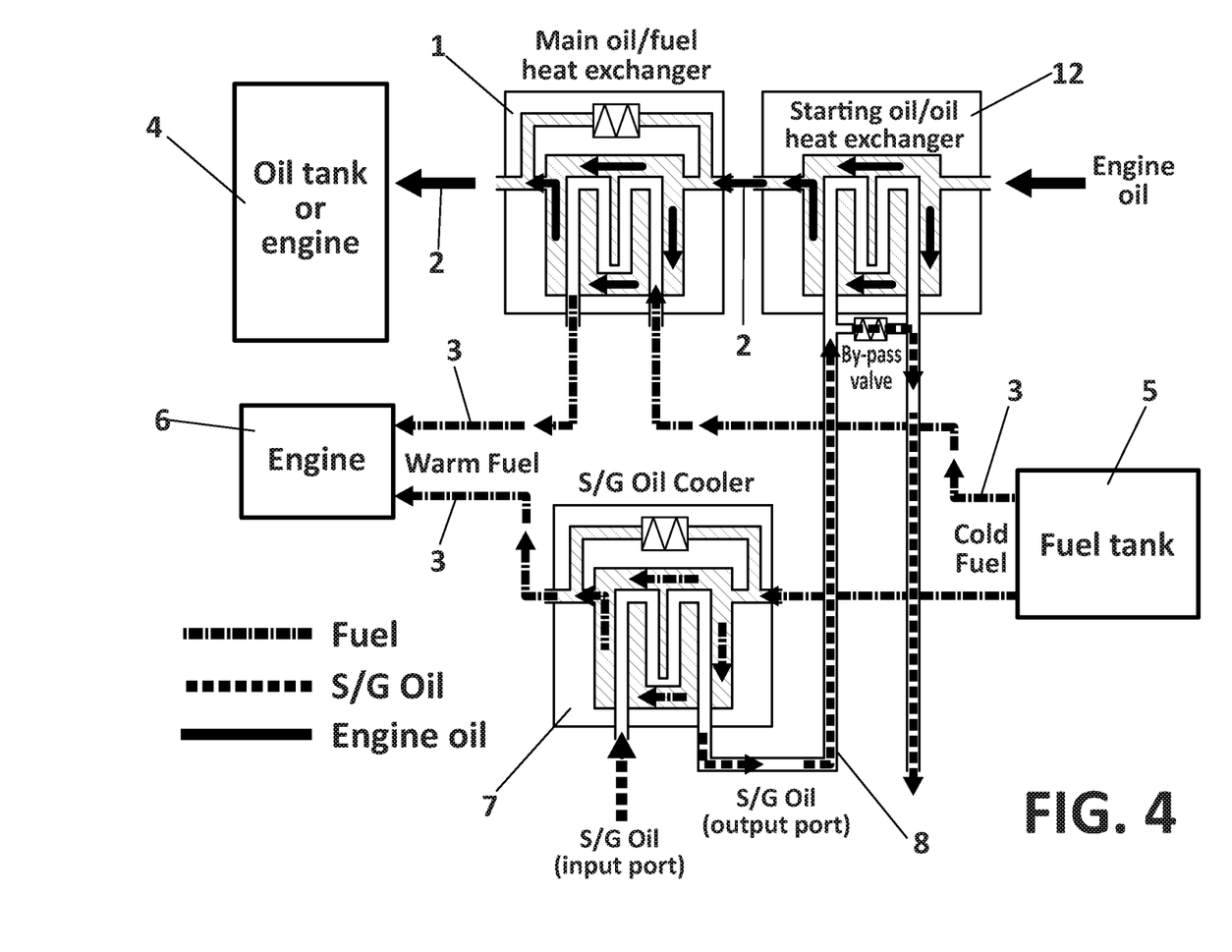
FIG. 4 shows the schematic diagram of FIG. 3 during normal operation when the turbine engine is running. The flows of fuel, turbine engine oil, and Starter Generator oil are identified.

FIG. 4 shows a main oil-to-fuel heat exchanger (1) connected with an engine oil circuit (2) and with a fuel circuit (3). The turbine engine oil circuit (2) conducts lubricating oil towards an oil reservoir (4) of a turbine engine. In turn, the fuel circuit (3) extends from a fuel tank (5) to the combustion chamber (6) for conducting fuel from a fuel tank (5) to a turbine engine combustion chamber (6).

At the oil-to-fuel heat exchanger (1), the lubricating oil for the turbine engine is cooled down by transferring heat from the engine oil, to the much cooler fuel pumped from the fuel tank (5). The fuel is therefore heated at the oil-to-fuel heat exchanger (1), and from there it is injected to a combustion chamber (6) of the turbine engine.

The system further comprises a Starter-Generator (S/G) oil-to-fuel heat exchanger (7), connected with a (S/G) oil circuit (8) and with the fuel circuit (3) for cooling the (S/G) oil.

Figure 3:
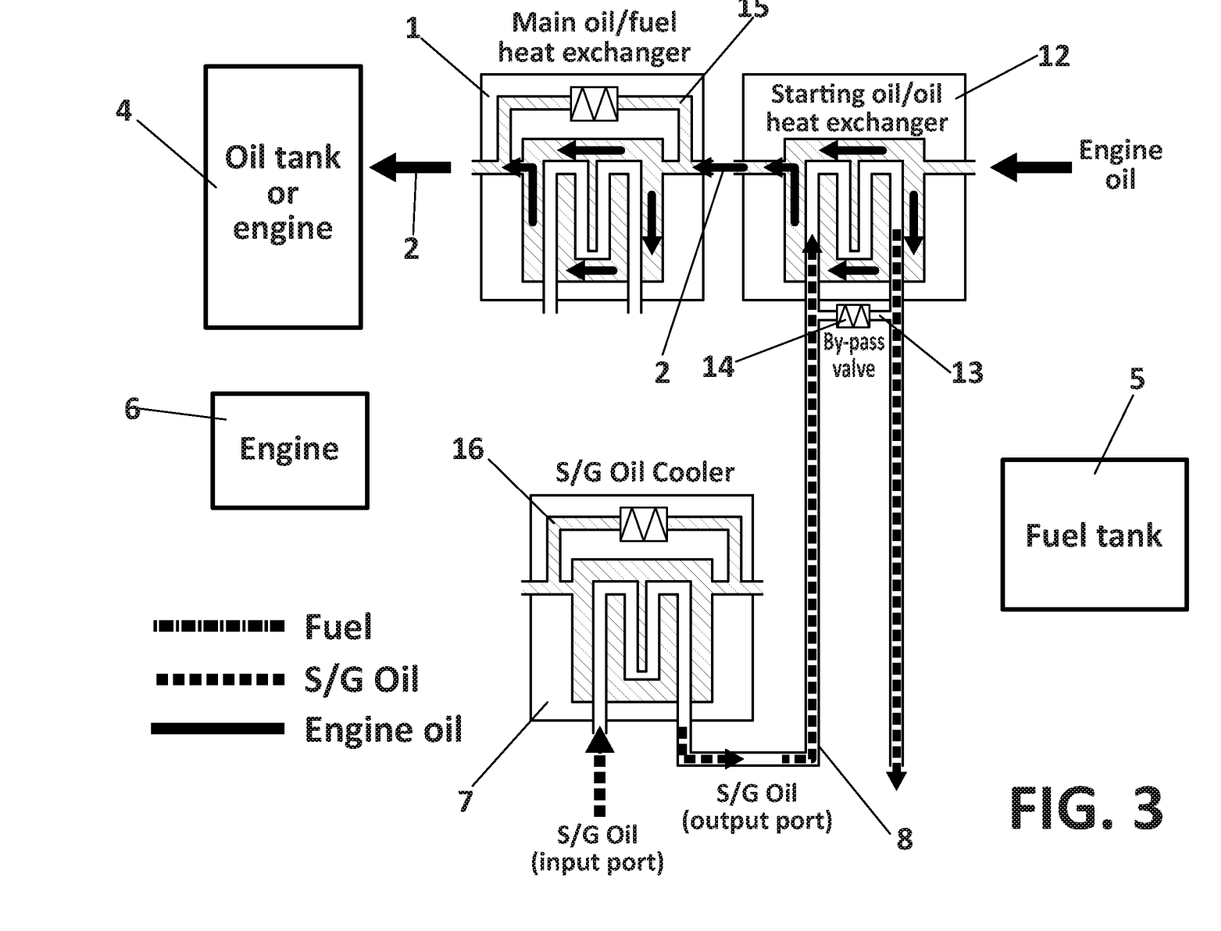
FIG. 3 shows a schematic diagram of an exemplary embodiment of an oil heating system adapted for turbomachinery according to the disclosure herein, during oil warm up operation when engine motoring is activated. The flows of turbine engine oil and SG oil are identified.

According to the disclosure herein, an oil-to-oil heat exchanger (12) is connected with both the engine oil circuit (2) and with the Starter Generator oil circuit (8). During the turbine engine motoring, prior to the actual starting sequence, the heat rejected by the Starter Generator to the oil can be transferred to the engine oil as to warm-up the engine oil to reduce the subsequent starting drag torque.

The oil-to-oil heat exchanger (12) and the main oil-to-fuel heat exchanger (1) are connected in series, and in the embodiment of FIGS. 3 and 4, the oil-to-oil heat exchanger (12) is arranged upstream the oil-to-fuel heat exchanger (1).

The oil-to-oil heat exchanger (12), the main oil-to-fuel heat exchanger (1) and the Starter Generator oil-to-fuel heat exchanger (7), have respectively a primary fluid path and a secondary fluid path thermally coupled with each other.

The primary fluid paths of the oil-to-oil and the main oil-to-fuel heat exchangers (12,1) are connected in series at the engine oil circuit (2). The secondary fluid paths of the oil-to-oil and the Starter Generator heat exchangers (12,7) are connected in series at the Starter Generator oil circuit (8), and the secondary fluid path of the main oil-to-fuel heat exchanger (1) and the primary fluid path of the Starter Generator oil heat exchanger (7) are connected with the fuel circuit (3).

A first bypass line (15) is connected in parallel with the primary fluid path of the main oil-to-fuel heat exchanger (1), and a second bypass line (16) is connected in parallel with the primary fluid path of the Starter Generator oil heat exchanger (7). In addition, another bypass line (13) is connected in parallel with the secondary fluid path of the Starter Generator oil-to-fuel heat exchanger (7).

During the motoring operational mode shown in FIG. 3, fuel does not flow through the oil-to-fuel heat exchanger since a dry cranking of the engine is performed (1).

After the motoring phase, when required engine oil temperature is reached, that is, during the normal operation of the turbine engine, the oil-to-oil heat exchanger (12) is bypassed and the system operates as shown in FIG. 4. For that, a bypass conduit (13) is connectable with the oil-to-oil heat exchanger (12) and with the Starter Generator oil circuit (8), for bypassing the Starter Generator oil circuit (8) out of the oil-to-oil heat exchanger (12). A bypass valve (14) is connected at the bypass conduit (13), so that this valve would open and close depending on the engine oil temperature, which is monitored by the engine electronic controller.

Alternatively, the engine electronic controller (not shown) is operatively associated with the bypass valve (14) for opening and closing the same, such as the electronic controller is adapted to close the bypass valve during an engine motoring mode, and to open the bypass valve while the turbine engine is running normally, as to prevent turbine engine overheating. That is, the valve will be closed during the motoring operational mode in order to put in contact the oil circuits from the Starter Generator and the engine. On the contrary, the valve will be opened when engine has been successfully started and the engine is running.

Preferably, the Starter Generator electronic controller (11) is programmed to increase the excitation current of the Starter/Generator (9) during the motoring phase in order to maximize the heat rejected to the oil and increase the oil temperature as much as possible, or reduce motoring time.

Figure 5:
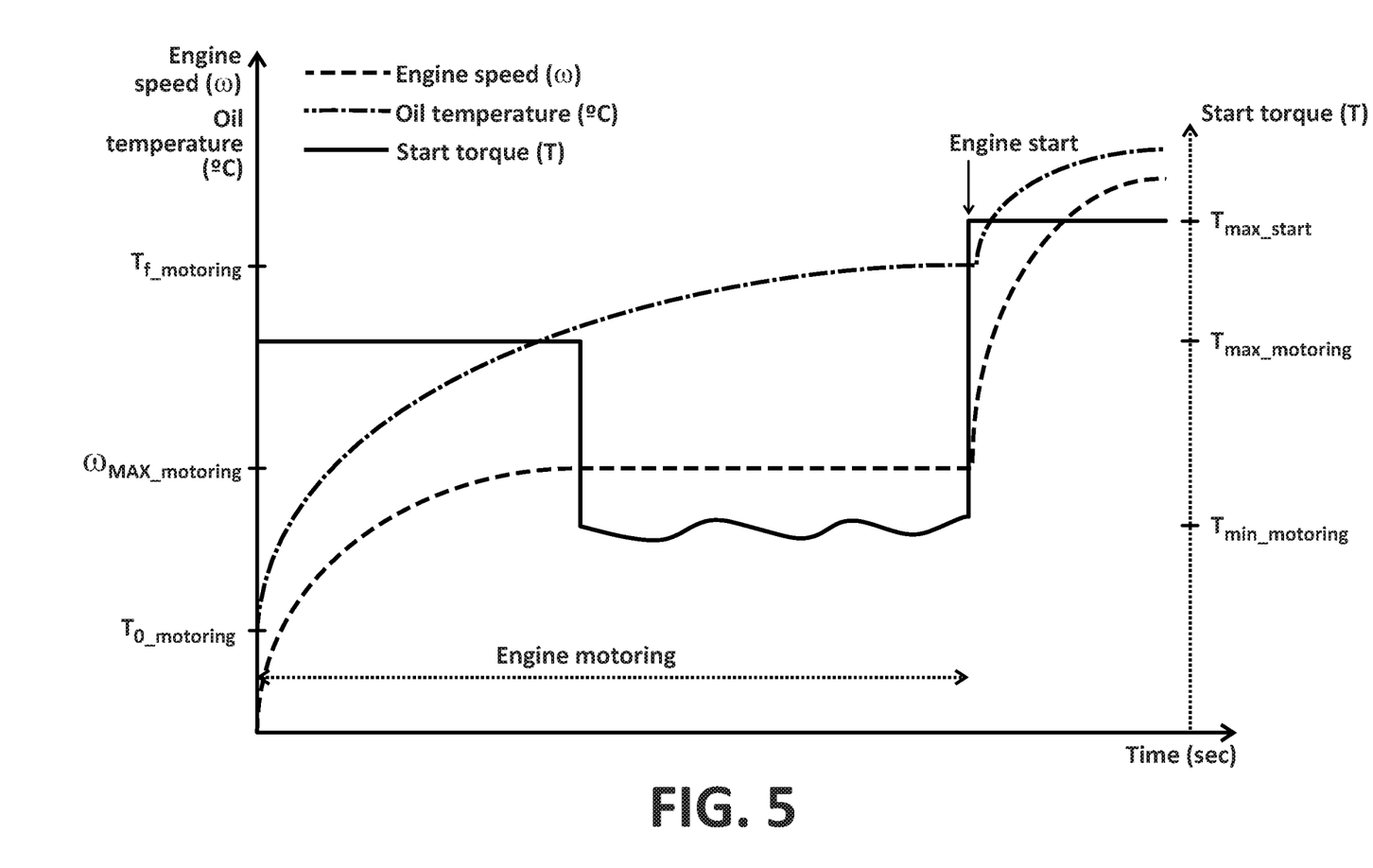
FIG. 5 shows a graph corresponding to the fast control mode for the oil heating operation.
Figure 6:
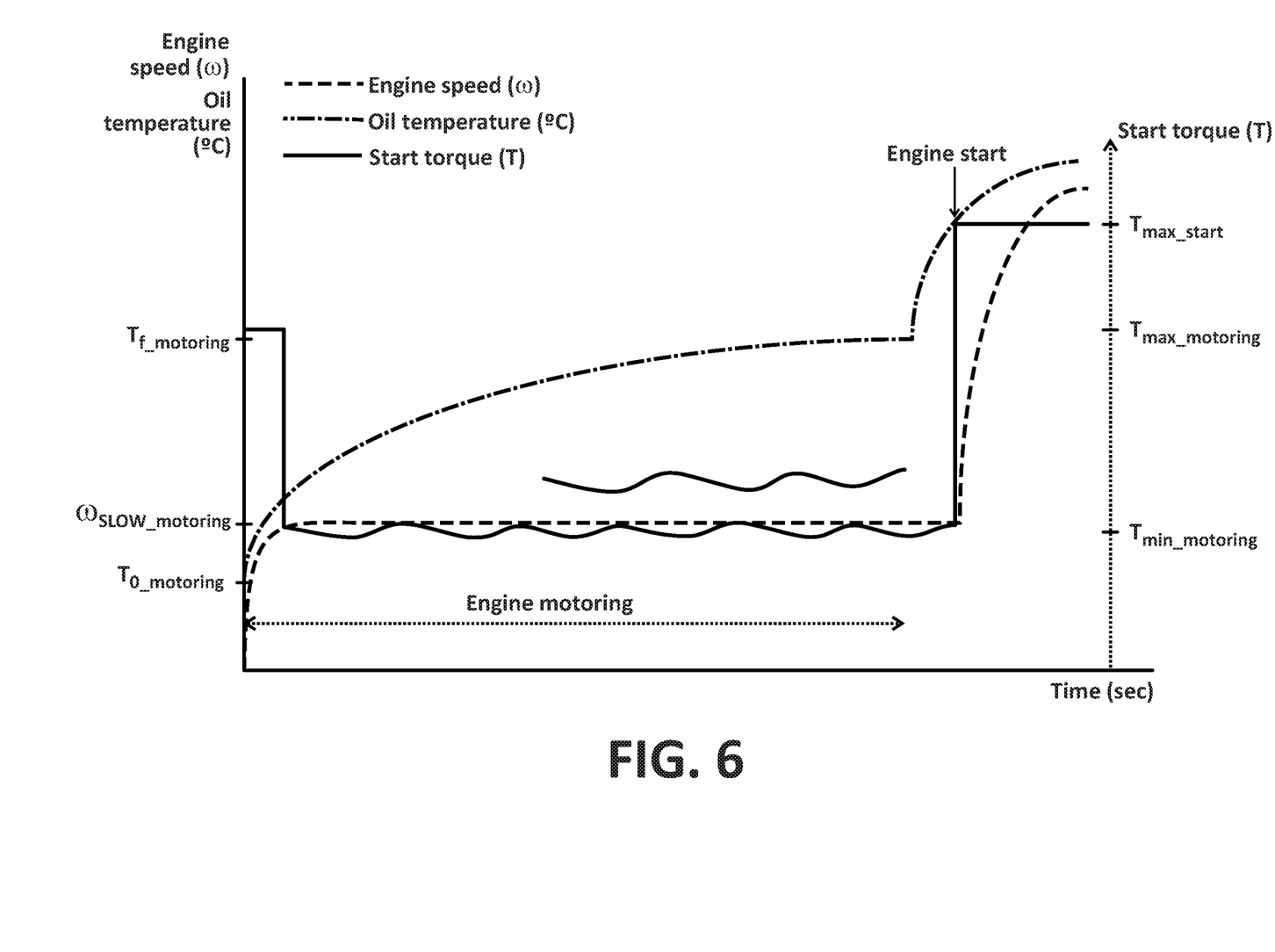
FIG. 6 shows a graph corresponding to the slow control mode for the oil heating operation.

Additionally, both the engine electronic controller and the Starter Generator controller are adapted or configured to operate the system in a motoring mode and in a normal operation mode. In turn, during the motoring mode, the electronic controller is adapted or configured to operate in two alternatives modes, namely:

- Fast mode represented in FIG. 5: motoring time is minimized. Engine Motoring speed is rapidly increased up to the maximum allowable, and later on maintained until the correct temperature allowing the actual starting sequence is reached
- Slow mode represented in FIG. 6: motoring time is not a critical parameter, but operational impact on ground due to eventual engine fan turning is mitigated, or even fully avoided. Therefore, motoring speed is always below maximum allowable during the whole motoring phase. Engine warm-up speed could be reduced to the minimum allowable to perform aircraft ground operation during the motoring. This option allows reducing the criticality of the motoring time as it will not affect aircraft operations and servicing.

The disclosure herein also refers to an aircraft comprising: a fuel tank, at least one turbine engine having a combustion chamber and a lubricating oil reservoir, an electric Starter Generator for starting the turbine engine and for generating electric power. The turbine engine may consist of or comprise a main engine of the aircraft (mainly used for propulsion), and/or the turbine engine of the aircraft APU.

An additional advantage of the disclosure herein, is that it can be easily retrofitted in existing aircrafts that have an electrical Starter Generator machine mechanically associated with the turbo-machine (either the main engines and/or APU); that is, the main components of the disclosure herein are already installed in the aircraft, except for the oil-to-oil heat exchanger (12) and bypass circuit (13, 14) with engine oil heating purpose.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims.

The invention claimed is:

1. A turbine oil heating system comprising:
   a turbine engine oil circuit for conducting lubricating oil to a turbine engine;
   an electric starter generator oil circuit for conducting cooling oil from an electric starter generator;
   an oil-to-oil heat exchanger connected with the engine oil circuit and connectable with the electric starter genera-
   tor oil circuit during turbine engine motoring prior to actual starting sequence, wherein the oil-to-oil heat exchanger is configured for transferring heat from the starter generator oil to the engine oil to warm-up the engine oil; and
   a starter generator controller in communication with the electric starter generator and programmed to operate the system in a normal operation mode in which the electric starter generator operates at a first excitation current and in a motoring mode in which the electric starter generator operates at a second excitation current that is increased relative to the first excitation current to increase a temperature of the cooling oil when the oil-to-oil heat exchanger is connected with the electric starter generator oil circuit during turbine engine motoring, wherein during the motoring mode the starter generator controller is programmed to increase a motoring speed up to a predetermined speed and maintain the predetermined speed until a target temperature of the lubricating oil is reached.

2. The turbine oil heating system according to claim 1, further comprising:
   a fuel circuit for conducting fuel to a turbine engine combustion chamber; and
   an electric starter generator oil-to-fuel heat exchanger connected with the starter generator oil circuit and with the fuel circuit for cooling the starter generator oil.

3. The turbine oil heating system according to claim 2, further comprising a main oil-to-fuel heat exchanger connected with the engine oil circuit and with the fuel circuit for cooling the engine oil.

4. The turbine oil heating system according to claim 3, wherein the oil-to-oil heat exchanger and the main oil-to-fuel heat exchanger are connected in series.

5. The turbine oil heating system according to claim 3, wherein the oil-to-oil heat exchanger, the main oil-to-fuel heat exchanger and the electric starter generator oil-to-fuel heat exchanger, have respectively a primary fluid path and a secondary fluid path thermally coupled with each other, and wherein the primary fluid paths of the oil-to-oil heat exchanger and the main oil-to-fuel heat exchanger are connected in series at the engine oil circuit, and wherein the secondary fluid paths of the oil-to-oil heat exchanger and the electric starter generator oil-to-fuel heat exchanger are connected in series at the electric starter generator oil circuit, and wherein the secondary fluid path of the main oil-to-fuel heat exchanger and the primary fluid path of the electric starter generator oil-to-fuel heat exchanger are connected with the fuel circuit.

6. The turbine oil heating system according to claim 1, further comprising a bypass conduit of the electric starter generator oil circuit for bypassing the oil-to-oil heat exchanger.

7. The turbine oil heating system according to claim 6, further comprising a bypass valve connected at the bypass conduit, wherein the valve is configured to open and close depending on engine oil temperature.

8. The turbine oil heating system according to claim 6, further comprising a bypass valve connected at the bypass conduit, and further comprising an electronic controller operatively associated with the bypass valve for opening and closing the bypass valve, and wherein the electronic controller is configured to close the bypass valve during the engine motoring mode, and to open the bypass valve while the turbine engine is running normally.

9. The turbine oil heating system according to claim 8, further comprising:

a fuel circuit for conducting fuel to a turbine engine combustion chamber;

an electric starter generator oil-to-fuel heat exchanger connected with the starter generator oil circuit and with the fuel circuit for cooling the starter generator oil; and a main oil-to-fuel heat exchanger connected with the engine oil circuit and with the fuel circuit for cooling the engine oil;

wherein in the motoring mode the fuel circuit bypasses the main oil-to-fuel heat exchanger and the electric starter generator oil-to-fuel heat exchanger.

10. The turbine oil heating system according to claim 9, wherein the electronic controller and the starter generator controller are configured to operate the system during the motoring mode either in a fast mode or in a slow mode, wherein in the fast mode an engine oil temperature target is reached faster than in the slow mode.

11. The turbine oil heating system according to claim 10, wherein the system is configured such that in the fast mode the motoring speed of the turbine engine is first increased up to a maximum speed, and after the maximum speed has been reached the motoring speed is maintained at a constant speed until the target temperature is reached.

12. The turbine oil heating system according to claim 10, wherein the system is configured such that in the slow mode the motoring speed of the turbine engine is always below a maximum speed.

13. An aircraft comprising:
a fuel tank;
a turbine engine having a combustion chamber and a lubricating oil reservoir;
an electric starter/generator for starting the turbine engine and for generating electric power;
a starter generator controller in communication with the electric starter generator; and
a turbine oil heating system comprising:
   a turbine engine oil circuit for conducting lubricating oil to the turbine engine;
   an electric starter generator oil circuit for conducting cooling oil from the electric starter generator; and
   an oil-to-oil heat exchanger connected with the engine oil circuit and connectable with the electric starter generator oil circuit during turbine engine motoring prior to actual starting sequence, wherein the oil-to-oil heat exchanger is configured for transferring heat from the starter generator oil to the engine oil to warm-up the engine oil;
wherein the turbine engine oil circuit is connected with the oil reservoir, and wherein a fuel circuit extends from the fuel tank to the combustion chamber; and
wherein the starter generator controller is programmed to operate the system in a normal operation mode in which the electric starter generator operates at a first excitation current and in a motoring mode in which the electric starter generator operates at a second excitation current that is increased relative to the first excitation current to increase a temperature of the cooling oil when the oil-to-oil heat exchanger is connected with the electric starter generator oil circuit during turbine engine motoring, wherein during the motoring mode the starter generator controller is programmed to increase a motoring speed up to a predetermined speed and maintain the predetermined speed until a target temperature of the lubricating oil is reached.

14. The aircraft according to claim 13 wherein the turbine engine is a main engine of the aircraft.

15. The aircraft according to claim 13 further comprising an auxiliary power unit (APU), and wherein the turbine engine is an engine of the APU.

* * * * *